(12) United States Patent
Choto et al.

(10) Patent No.: US 10,074,476 B2
(45) Date of Patent: *Sep. 11, 2018

(54) FERRITE COMPOSITION AND ELECTRONIC COMPONENT (71) Applicant: TDK CORPORATION, Tokyo (JP)

(72) Inventors: Hiroki Choto, Tokyo (JP); Takeshi Shibayama, Tokyo (JP); Ryuichi Wada, Tokyo (JP); Kouichi Kakuda, Tokyo (JP); Yukari Akita, Tokyo (JP); Asuka Murai, Tokyo (JP); Yukio Takahashi, Tokyo (JP); Takashi Suzuki, Tokyo (JP); Akinori Ohi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 133 days.

This patent is subject to a terminal disclaimer.

(21) Appl. No.: 15/090,196

(22) Filed: Apr. 4, 2016

(65) Prior Publication Data

US 2016/0300651 A1 Oct. 13, 2016

(30) Foreign Application Priority Data

Apr. 2, 2015 (JP) ................. 2015-076161
Mar. 15, 2016 (JP) ................. 2016-051085

(51) Int. Cl.
| | |
|---|---|
| *C04B 35/30* | (2006.01) |
| *H01F 41/02* | (2006.01) |
| *C04B 35/26* | (2006.01) |
| *H01F 1/34* | (2006.01) |
| *H01F 27/28* | (2006.01) |

(52) U.S. Cl.
CPC ..... *H01F 41/0246* (2013.01); *C04B 35/2666* (2013.01); *H01F 1/344* (2013.01); *H01F 27/2804* (2013.01); *H01F 2027/2809* (2013.01)

(58) Field of Classification Search
CPC .......................... H01F 1/344; C04B 35/2666
See application file for complete search history.

(56) References Cited

U.S. PATENT DOCUMENTS

| 6,287,479 B1 | 9/2001 | Tanaka |
| 2008/0296528 A1 | 12/2008 | Sutoh et al. |
| 2015/0097137 A1 | 4/2015 | Wada et al. |

FOREIGN PATENT DOCUMENTS

| CN | 104513058 A | | 4/2015 |
| JP | H09-295862 A | | 11/1997 |
| JP | 2000-252112 A | | 9/2000 |
| JP | 2006-206347 | * | 8/2006 |
| JP | 2006-206347 A | | 8/2006 |
| JP | 2008-300548 A | | 12/2008 |

OTHER PUBLICATIONS

Translation for JP 2006-206347, Aug. 10, 2006.*
Abstract for CN 104513055, Apr. 15, 2015.*

* cited by examiner

*Primary Examiner* — Carol M Koslow
(74) *Attorney, Agent, or Firm* — Oliff PLC (57) ABSTRACT A ferrite composition composed of a main component including 26 to 46 mol % of an iron oxide in terms of $Fe_2O_3$, 4 to 14 mol % of a copper oxide in terms of CuO, 0 to 26 mol % of a zinc oxide in terms of ZnO, and a residue of 40.0 mol % or more of a nickel oxide in terms of NiO. The ferrite composition, with respect to 100 parts by weight of the main component, is also composed of a subcomponent including 0.8 to 10.0 parts by weight of a silicon compound in terms of $SiO_2$, 1.0 to 15.0 parts by weight of a cobalt compound in terms of $Co_3O_4$, and 0.7 to 30.0 parts by weight of a bismuth compound in terms of $Bi_2O_3$. A value of the cobalt compound content in terms of $Co_3O_4$ divided by the silicon compound content in terms of $SiO_2$ is 0.4 to 5.5.

11 Claims, 3 Drawing Sheets

FERRITE COMPOSITION AND ELECTRONIC COMPONENT

BACKGROUND OF THE INVENTION

1. Field of the Invention

The present invention relates to a ferrite composition preferable for manufacturing such as a multilayer inductor, and to an electronic device having a ferrite sintered body composed of said composition.

2. Description of the Related Art

Recently, down-sizing and high frequency of DC-DC converters are progressed. And the DC-DC converters driven by around several tenths MHz to several hundreds MHz frequency are appeared. For inductors applied to the DC-DC converters which down-sizing and high frequency are progressed, frequency characteristics, in which the inductors are driven even in a high frequency region, and DC superposition characteristics, in which the operation does not substantially change even when large current is applied, are required.

As ferrite compositions used for the inductors applied to the DC-DC converters, NiCuZn ferrite added with cobalt is being proposed from before. By adding cobalt to NiCuZn ferrite, methods to improve magnetic anisotropy and to improve frequency characteristics of permeability have been examined.

It is known from before, however, that sintering property tends to lower and temperature characteristic tends to deteriorate the NiCuZn ferrite added with cobalt, relative to the NiCuZn ferrite without an addition of cobalt. The methods shown below are proposed, in order to overcome the demerit of the above-mentioned cobalt addition.

Patent Article 1 discloses NiCuZn ferrite which overcomes the demerit of sintering property by adding bismuth compound, such as bismuth oxide, together with cobalt compound. In addition, Patent Article 1 discloses NiCuZn ferrite, which is trying to improve the temperature characteristics by adding zirconium compounds.

Patent Article 2 discloses NiCuZn ferrite in which $Co_3O_4$, $SiO_2$ and $Bi_2O_3$ are added, trying to obtain a high Q value, a superior temperature characteristic, and a high proof stress.

Patent Article 3 discloses NiCuZn ferrite in which amounts of $Fe_2O_3$ and ZnO are relatively small, and CoO is further added, trying to obtain a ferrite composition superior in frequency characteristic.

Examples of Patent Article 1 shows initial permeability $\mu_i$ value, however, how high frequency this permeability value is maintained is not described. According to Snoek's limit, in general, the permeability value is maintained to a high frequency as the value of the initial permeability $\mu_i$ is low. However, in case of adding additives, the permeability is maintained to a high frequency to Snoek's limit or more; and to the contrary, the permeability lowers to a low frequency to Snoek's limit or less. Thus, the initial permeability $\mu_i$ may become an example of the frequency characteristic, however, there is little evidence to become an evaluation criteria of the frequency characteristic. Thus, the frequency characteristic is unknown in the examples of Patent Article 1.

Note Snoek's limit is shown by the following equation (1). Note $f_r$ is a rotating magnetized resonance frequency, $\mu_i$ is an initial permeability, $\gamma$ is a gyromagnetic constant, and $M_s$ is a saturation magnetization.

$$f_r(\mu_i-1)=|\gamma|\times(M_s/3\pi) \quad \text{Equation (1)}$$

In addition, Patent Article 1 shows a ratio of the initial permeability at 20° C. and the initial permeability at 85° C., considering temperature change of the permeability in case when a zirconium oxide is added. The smallest ratio of the initial permeability at 20° C. and the initial permeability at 85° C. in examples of Patent Article 1 is 1.45 times. This result is too large to determine that the initial permeability change with respect to temperature change is prevented.

Further, according to Patent Article 2, the initial permeability value is not shown and the frequency characteristic is unknown. According to Patent Article 3, the temperature characteristic is unknown. In addition, according to Patent Articles 1 to 3, their DC superposition characteristics are unknown.

Considering all above, it is unknown that the frequency characteristic, the DC superposition characteristics, and the temperature characteristics of NiCuZn ferrite according to Patent Articles 1 to 3 are all superior.

[Patent Article 1] Japanese Unexamined Patent Publication No. 2000-252112

[Patent Article 2] Japanese Unexamined Patent Publication No. 2006-206347

[Patent Article 3] Japanese Unexamined Patent Publication No. 2008-300548

SUMMARY OF THE INVENTION

The present invention has been made by considering the above circumstances, and objects of the invention is to provide the ferrite compositions, which may be sintered at a low temperature, maintains permeability upto a high frequency of several hundreds MHz, shows superior DC-current superimposition characteristic and temperature characteristic, and shows high specific resistance $\rho$, and to provide electronic components using the abovementioned ferrite compositions.

In order to achieve such objects, ferrite composition according to the invention has a main component and a subcomponent. The main component includes 26 to 46 mol % of an iron oxide in terms of $Fe_2O_3$, 4 to 14 mol % of a copper oxide in terms of CuO, 0 to 26 mol % of a zinc oxide in terms of ZnO, and a residue of 40.0 mol % or more of a nickel oxide in terms of NiO. The subcomponent includes 0.8 to 10.0 parts by weight of a silicon compound in terms of $SiO_2$, 1.0 to 15.0 parts by weight of a cobalt compound in terms of $Co_3O_4$, and 0.7 to 30.0 parts by weight of a bismuth compound in terms of $Bi_2O_3$, with respect to 100 parts by weight of the main component. A ratio of the content of cobalt compound in terms of $Co_3O_4$ divided by a content of the silicon compound in terms of $SiO_2$ is 0.4 to 5.5.

The ferrite composition of the invention is possible to sinter at a low temperature by determining the content amount of the oxides composing the main component within the above range, and further including the silicon compound, the cobalt compound, and bismuth compound within the above range as subcomponent. For instance, the ferrite composition can be sintered at around 900° C., which is the same or less with the melting point of Ag, possible to be used as an internal electrode. In addition, the ferrite sintered body composed of the ferrite composition according to the invention shows high initial permeability $\mu_i$ and specific resistance $\rho$, and is superior in all frequency characteristic, DC-current superimposition characteristic and temperature characteristic.

An indication of obtaining such effects conceived to be compounded effects obtainable by setting the content amounts of the main component within a predetermined range and of each component within a particular range.

The electronic component according to the invention includes a ferrite sintered body composed of the abovementioned ferrite composition.

Note the ferrite sintered body composed of the ferrite composition according to the invention is preferably used for the multilayer inductor, the multilayer L-C filter, the multilayer common mode filter, and composite electronic components by the other laminating method, and so on. For instance, the ferrite composition according to the invention is also suitably used for the LC composite electronic component, the NFC coil, the multilayer impedance element and the multilayer transformer.

DESCRIPTION OF THE PREFERRED EMBODIMENTS

Hereinafter, the present invention will be described based on the embodiments shown by the figures.

Figure 1:
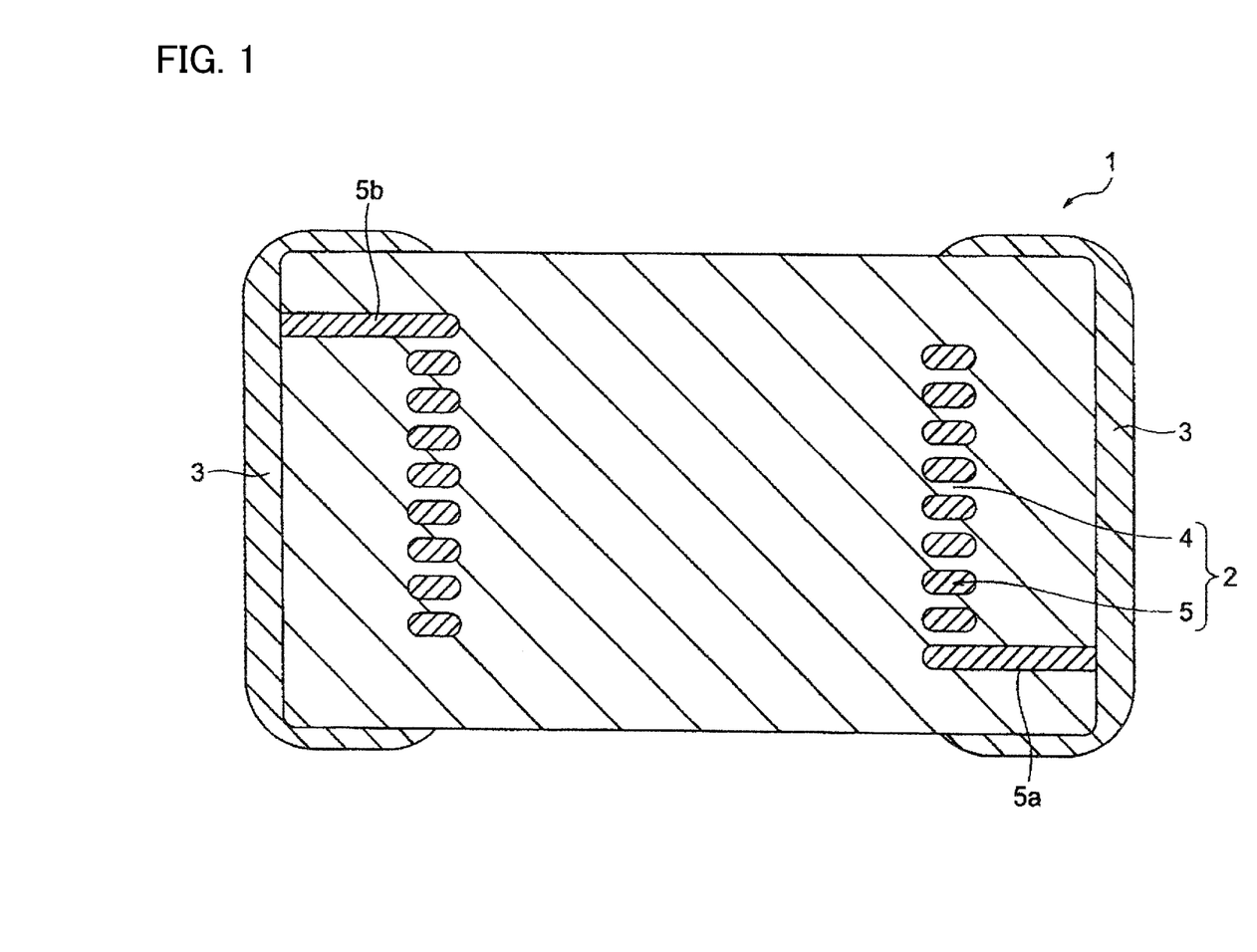
FIG. 1 is a cross-sectional view of the multilayer inductor according to an embodiment of the present invention.

As is shown in FIG. 1, the multilayer inductor 1 according to an embodiment of the invention has the element 2 and the terminal electrode 3. The element 2 is obtainable by firing a green multilayered body in which the coil conductor 5 is formed three-dimensionally in a spiral shape via ferrite layer 4. The ferrite layer 4 is composed by the ferrite composition according to an embodiment of the invention. The multilayer inductor 1 is obtainable by forming terminal electrodes 3 on both ends of the element 2 and connecting the terminal electrodes 3 via extraction electrodes 5a, 5b. Formation of the element 2 is not particularly limited; and it is generally a rectangular parallelepiped shape. Further, the size is not particularly limited, and can be suitably determined according to the usage.

Materials of the coil conductor 5 and the extraction electrodes 5a, 5b are not particularly limited, and Ag, Cu, Au, Al, Pd, Pd/Ag alloys, and so on can be used. Note Ti compound, Zr compound, Si compound, and so on may be added.

The ferrite composition according to the present embodiment is Ni—Cu based ferrite or Ni—Cu—Zn based ferrite, and includes iron oxide, copper oxide, nickel oxide, and may include zinc oxide as the main component.

Content amount of iron oxide is, in terms of $Fe_2O_3$, 26 to 46 mol %, preferably 29 to 46 mol %, and more preferably 32 to 44 mol %, among 100 mol % of the main component. Sintering property is deteriorated when content amount of the iron oxide is excessively large or excessively small. In particular, sintering density during sintering at a low temperature tends to decrease. In addition, permeability tends to decrease when content amount of the iron oxide is excessively small. The frequency tends to deteriorated and quality coefficient Q value (ratio of inductive reactance and resistance of a coil at a particular frequency) at a high frequency tends to lower when content amount of the iron oxide is excessively large. The temperature characteristics further tend to deteriorate when content amount of the iron oxide is excessively large.

Content amount of the copper oxide is, in terms of CuO, 4 to 14 mol %, and preferably 4 to 12 mol %, among 100 mol % of the main component. In case when content amount of the copper oxide is excessively small, the sintering property tends to deteriorate, and in particular, sintering density during sintering at a low temperature tends to decrease. In case content amount of copper oxide is excessively large, the Q value tends to decrease.

Content amount of zinc oxide is, in terms of ZnO, 0 to 26 mol %, among 100 mol % of the main component. Namely, it is not necessary to include zinc oxide as the main component. Content amount of zinc oxide is preferably 0 to 11 mol %. Initial permeability tends to increase as content amount of the zinc oxide becomes large. Note it becomes preferable for the inductor as the initial permeability becomes high. Curie temperature tends to decrease when content amount of zinc oxide is large.

The residue of the main component is composed of nickel oxide, and the content amount of the nickel oxide is 40.0 mol % or more. The content amount of said nickel oxide is preferably 44.0 to 55.0 mol %.

The temperature characteristics are deteriorated when content amount of the nickel oxide is excessively small.

The ferrite composition according to an embodiment of the invention, in addition to the above main component, includes the silicon compound, the cobalt compound, and the bismuth compound as the subcomponent. Note as a kind of the each compound, it is not particularly limited; and it is not limited if it is an oxide or becomes an oxide after firing.

Content amount of silicon compound is, with respect to 100 parts by weight of the main component, 0.8 to 10.0 parts by weight, and preferably 0.8 to 6.0 parts by weight in terms of $SiO_2$. Temperature characteristic of the ferrite composition improves as the silicon compound is included within an amount of a predetermined range. In case when content amount of silicon compound is excessively large, the sintering property is deteriorated, and in particular, the sintering density during sintering at a low temperature tends to deteriorate.

The reason to improve the temperature characteristics by the silicon compound addition will be described. The silicon compounds, such as silicon oxide and the like, shows small linear expansion coefficient relative to NiCuZn ferrite particles. Namely, in case when the ferrite composition is formed by adding silicon compound to NiCuZn ferrite, the added silicon compound is previously applying stress to NiCuZn ferrite. The stress generated by the presence of silicon compound is applied, and thus, the present inventors consider that an influence of the stress generated by the temperature change becomes less, and the temperature characteristics improve.

Content amount of the bismuth compound in terms of $Bi_2O_3$ is, with respect to 100 parts by weight of the main component, 0.7 to 30.0 parts by weight, and preferably 0.7 to 10.0 parts by weight. The above mentioned silicon compound and the latter mentioned bismuth compound have an effect to lower the sintering property. To the contrary, sintering property of the bismuth compound is heightened, and firing at a temperature of 900° C. or less is made possible. The sintering property is deteriorated and the sintering density during sintering at a low temperature tends to decrease, when content amount of the bismuth compound is excessively small. Further, together with the deterioration of the sintering property, the specific resistance ρ also tends to decrease. In case when content amount of bismuth compound is excessively large, there is a case when $Bi_2O_3$ in the ferrite composition exudates to outer part during firing. In case of applying the ferrite composition, including excessively large amount of the bismuth compound, to electronic components and producing said devices on a large scale, several electronic components may be connected due to exudation of $Bi_2O_3$. In addition, due to the exudation of $Bi_2O_3$, the electronic components may be adhered to the setter in which electronic component are mounted.

Content amount of the cobalt compound in terms of $Co_3O_4$ is, with respect to 100 parts by weight of the main component, 1.0 to 15.0 parts by weight, preferably 1.0 to 8.5 parts by weight, and more preferably 1.0 to 5.0 parts by weight. Frequency characteristic improves by including the cobalt compound within a predetermined range. DC superposition characteristics further improves. Namely, the inductance decrease becomes small when superposing DC current. Depending on the content amount of cobalt additives, inductance may even increase when superposing DC current. The frequency characteristic tends to deteriorate and the quality coefficient Q value at high frequency tends to lower, when content amount of the cobalt compound is excessively small. In addition, specific resistance ρ tends to lower. The sintering property tends to deteriorate, and in particular, the sintering density during sintering at a low temperature tends to decrease, in case when content amount of the cobalt compound is excessively large. In addition, the temperature characteristics tend to deteriorate.

In addition, in the ferrite composition according to the present embodiment, the ratio (hereinafter, shown as Co/Si) of the content of cobalt compound, on the basis of weight and in terms of $Co_3O_4$, divided by the content of silicon compound, on the basis of weight and in terms of $SiO_2$, is 0.4 to 5.5. Co/Si is preferably 1.5 to 5.0.

The abovementioned Co/Si limitation shows that an allowable range of cobalt compound content amount varies by the additive amount of silicon compound. In case when Co/Si exceeds 5.5 due to small content amount of silicon compound, even when content amount of the cobalt compound is 15.00 parts by weight or less, the temperature characteristics tend to deteriorate and specific resistance ρ tends to lower. In case when Co/Si is lower than 0.4, the frequency characteristics are lowered, relative to the samples having the equivalent permeability.

In the ferrite composition according to an embodiment, the composition range of the main component is controlled to the abovementioned range, and the abovementioned silicon compound, bismuth compound, and cobalt compound are all included within a range of the present invention, as subcomponents. Thus, the sintering temperature may be lowered, and metals having relatively low melting point, such as Ag, may be used as an integrally fired internal conductor. Further, the ferrite sintered body obtained by low temperature firing shows a high initial permeability, the frequency characteristic is good, the specific resistance ρ is high, the DC superposition characteristic is good, and temperature characteristic is good. In particular, the DC superposition characteristic becomes good due to an interaction between cobalt compound and silicon compound.

Note the above effects cannot be sufficiently obtained, in case when one or more of either of the silicon compound, bismuth compound, and the cobalt compound is not included, or one or more of either of their content amount is without the range of the invention. Namely, the abovementioned effects are conceivable that they are a composite effect, which can be acquired for the first time when predetermined amounts of the silicon compound, the bismuth compound, and the cobalt compound are simultaneously included.

Further, the ferrite composition according to the present embodiment, other than the above subcomponents, additional components such as manganese oxide such as $Mn_3O_4$, zirconium oxide, tin oxide, magnesium oxide, glass compound can be further included in such amounts as not to inhibit the effects of the invention. Although the content amounts of said additional components are not particularly limited, for instance, it is around 0.05 to 1.0 wt %.

In particular, content amount of the zirconium oxide is preferably 1.0 wt % or less, including zero, in terms of $ZrO_2$.

Further, the ferrite composition according to the present embodiment may include oxides of inevitable impurity element.

Concrete examples of the inevitable impurity element are C, S, Cl, As, Se, Br, Te, I, typical metal elements such as Li, Na, Mg, Al, Ca, Ga, Ge, Sr, Cd, In, Sb, Ba, Pb, transition metal elements such as Sc, Ti, V, Cr, Y, Nb, Mo, Pd, Ag, Hf, Ta. In addition, oxides of the inevitable impurity elements may be included in the ferrite composition if it is around 0.05 wt % or less.

Ferrite composition according to an embodiment of the invention includes the ferrite grains and crystal grain boundaries, existing between adjacent crystal grains. The average crystal grain size of the crystal grains is preferably 0.2 to 1.5 μm.

Next, the frequency characteristic of the ferrite composition according to the invention is described.

The frequency characteristic of the ferrite composition according to the invention shows whether permeability can be maintained to the high frequency.

Figure 3:
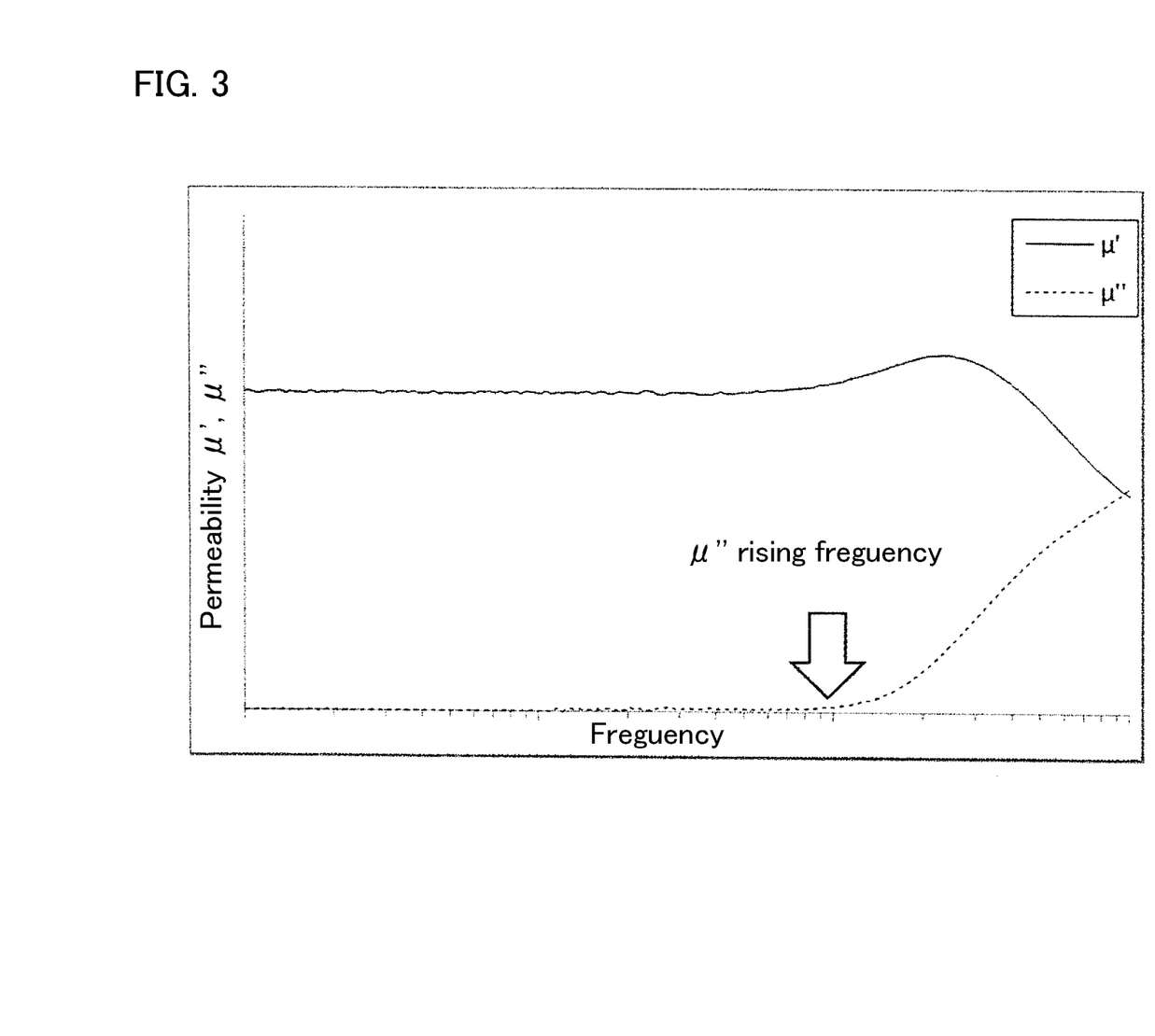
FIG. 3 is a schematic view of permeability frequency characteristics according to NiCuZn ferrite.

To describe the frequency characteristic of the ferrite composition of the invention, FIG. 3 shows the schematic view of a general NiCuZn ferrite, in which frequency is indicated in a horizontal shaft, and the real part and the imaginary part μ" of complex permeability are indicated in a vertical shaft.

In low frequency region, even when frequencies are varied, μ' is almost constant and μ" is almost constant near "0". μ" exhibits to rise from "0" when the frequency is increased to a predetermined frequency or more. In the present invention, frequency showing μ">0.1, is determined μ" rising frequency.

In the region of a frequency, which is the μ" rising frequency or more, Q value is lowered and use as the inductor becomes difficult. Therefore, the upper limit of the frequency, at which the ferrite composition of the invention can be used as the inductor, becomes higher, as μ" rising frequency becomes higher. According to ferrite composition of the invention, the frequency characteristic becomes good as μ" rising frequency becomes higher. Hereinafter, μ" rising frequency may be mentioned as "f".

In addition, μ" rising frequency "f" generally becomes low, as the initial permeability $μ_i$ becomes higher. Therefore, in order to determine the frequency characteristic of the ferrite composition good, not only the frequency characteristics irrelevant to the permeability derived from the height of μ" rising frequency "f", but the relative frequency characteristic with respect to permeability are required to be good.

The inventors of the invention have found, from the abovementioned equation of Snoek's limit, $$f \times (μ_i - 1)$$

is an effective index of the relative frequency characteristic with respect to the permeability. Relative frequency characteristic with respect to permeability becomes good, as $f \times (μ_i - 1)$ becomes large.

An example of a method of manufacturing the ferrite composition according to the present embodiment will be explained. First, starting materials (materials of the main component and of the subcomponent) are weighed to be a prescribed compositional ratio and then mixed to obtain the material mixture. Wet mixing using a ball mill, dry mixing using a dry mixer, and so on can be mentioned as said mixing method. Note starting materials having the average particle size of 0.05 to 1.0 μm is preferably used.

Iron oxide ($\alpha$-$Fe_2O_3$), copper oxide (CuO), nickel oxide (NiO), zinc oxide (ZnO) when required, or composite oxides can be used as the materials of the main component. Further, various compounds, becoming the abovementioned oxides, composite oxides after firing, or the like, can be used. For instance, metal simple substance, carbonate, oxalate, nitrate, hydroxide, halide, organic metal compound, and so on can be mentioned as compounds which become the abovementioned oxides after firing.

Silicon oxide, bismuth oxide and cobalt oxide can be used as the subcomponent material. Oxides which become the subcomponent material are not particularly limited, and such as composite oxides may be used. Further, the other various compounds which become the abovementioned oxides or composite oxides after firing can be used. For instance, metal simple substance, carbonate, oxalate, nitrate, hydroxide, halide, organic metal compound, and so on can be mentioned as compounds which become the abovementioned oxides after firing.

Note $Co_3O_4$, an embodiment of cobalt oxide, is easy for storage and for handling; and the valency number thereof is stable in air. Therefore, it is preferable for materials of cobalt oxide.

Next, material mixtures are calcined, and calcined materials are obtained. The calcine is performed to convert the material mixture into a form suitable for the subsequent step, by thermal decomposition of the material, homogenization of the component, generation of the ferrite, and decomposition of ultrafine powder and grain growth to a suitable grain size due to sintering. Calcined time and calcined temperature are not particularly limited. Such calcination is carried out preferably at a temperature of 500 to 900° C. for generally around 2 to 15 hours. Although calcine is generally carried out in atmosphere (air), calcine may be carried out in an atmosphere where oxygen partial pressure is lower than the atmosphere (air). Note materials of the main component and the same of subcomponent can be mixed before or after the calcination.

Next, pulverizing of the calcined material is carried out, and pulverized material is obtained. Said pulverization is carried out in order to obtain powders which have suitable sintering property by breaking coagulation of the calcined material. In case the calcined material forms large bulks, wet pulverizing using ball mill, attritor, and so on is carried out after the coarse pulverization. The wet pulverizing is carried out when the average grain size of the pulverized material becomes preferably 0.1 to 1.0 μm or so.

With the use of the obtained pulverized material, the multilayer inductor according to the embodiment is manufactured. Although the method of manufacturing the multilayer inductor is not limited, a sheet method is used hereinafter.

First, the obtained pulverized material is slurried with additives, such as solvent or binder, and manufactured a paste. Green sheet is formed using this paste. Next, the multilayer inductor according to the present embodiment is obtained by processing the formed green sheet to a predetermined formation, and then going through binder removal process and firing process. The firing is performed at a temperature of the melting point or less of the coil inductor 5 and the extraction electrodes 5a, 5b. For instance, in case when the coil inductor 5 and the extraction electrodes 5a, 5b are Ag (the melting point is 962° C.), it is preferably performed at 850 to 920° C. Firing time is generally 1 to 5 hours. The firing may be carried out in an atmosphere (air) or in an atmosphere where the oxygen partial pressure is lower than the atmosphere (air). Thus obtained multilayer inductor is composed of the ferrite composition according to the present embodiment.

Figure 2:
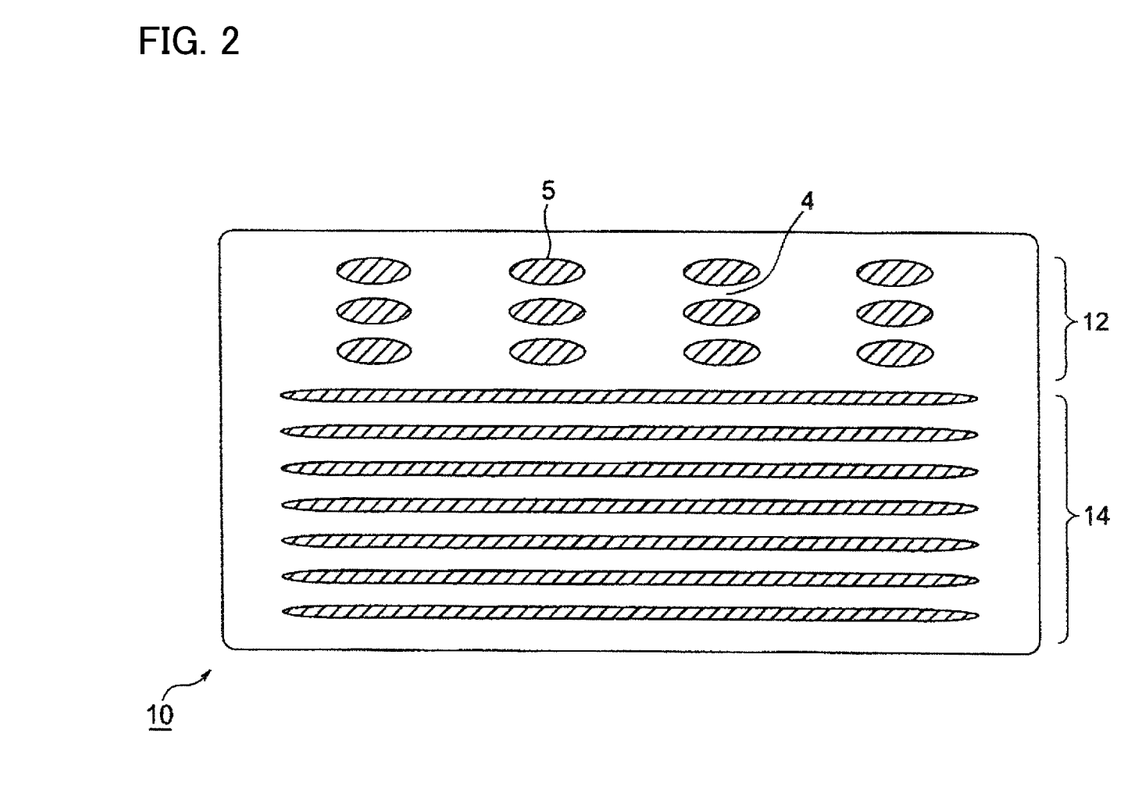
FIG. 2 is a cross-sectional view of LC composite electronic component according to an embodiment of the present invention.

Embodiments of the present invention are described hereinbefore, the invention is not limited to such embodiments, and can be carried out in various embodiments within a range not deviated from the outline of the invention. For instance, the ferrite composition of the invention can be used as the ferrite layer 4 of LC composite electronic component 10 shown in FIG. 2. Note in FIG. 2, the numeral 12 is the inductor part and the numeral 14 is the condenser part.

EXAMPLES

Hereinafter, the present invention will be described based on the further details of the examples; however, the invention is not limited to the examples.

Firstly, $Fe_2O_3$, NiO, CuO and ZnO were prepared as materials of the main component. $SiO_2$, $Bi_2O_3$ and $Co_3O_4$ were prepared as materials of the subcomponent.

Next, the prepared main component materials were weighed to obtain the composition of the sintered body as described in Tables 1 to 5, and subsequently, wet mixed for 16 hours by ball mill, and the material mixture was obtained.

Next, calcination was carried out at 500 to 900° C. in air after drying the obtained material mixture, and the calcined powder was obtained. The calcined powder and material powder of the subcomponent were wet pulverized for 72 hours by a steel ball mill, and the pulverized powder was obtained.

Next, after drying said pulverized powder, 10.0 parts by weight of 6 wt % condense polyvinyl alcohol aqueous solution as a binder were added to 100 parts by weight of the pulverized powder, and granulated thereof and made to a granule. Said granule was pressure formed and obtained a formed body of toroidal shape (size=outer diameter of 13 mm×inner diameter of 6 mm×height of 3 mm), and a formed body of a disk shape (size=outer diameter of 12 mm×height of 2 mm), making the formed density 3.20 Mg/m³.

Next, said each formed body was fired in air at 900° C., which is the melting point (962° C.) of Ag or less, for 2 hours and obtained the sintered bodies of a toroidal core sample. Further, the following characteristic evaluations were performed to the each sample. Test results are shown in Tables 1 to 5. Content amounts of each component shown in Tables 1 to 5 are the values converted to $Fe_2O_3$, NiO, CuO, ZnO, $SiO_2$, $Co_3O_4$ and $Bi_2O_3$, respectively.

Initial Permeability $\mu_i$

The copper wire was wound to the toroidalcore sample for 10 turns, and initial permeability μi was measured using an impedance analyzer (4991A made by Agilent Technologies). Measuring conditions were measuring frequency of 1 MHz and measuring temperature of 25° C. In the present Examples, 1.5 or more of initial permeability $\mu_i$ was determined good.

Frequency Characteristic (μ" Rising Frequency)

μ" of the toroidal core sample, which initial permeability $\mu_i$ was measured, was measured by increasing the measuring frequency from 1 MHz. The frequency when μ" is over 0.1 was determined the μ" rising frequency. The frequency characteristic was determined good when μ" rising frequency "f" was 200 MHz or more. The frequency characteristic was determined particularly good when μ" rising frequency "f" was 250 MHz or more.

Relative Frequency Characteristic Relative frequency characteristic with respect to the permeability was determined good, when f×($\mu_i$−1) is 1,000 or more.

Specific Resistance ρ

In—Ga electrode was coated on both sides of the disk sample, measured DC resistance value, and specific resistance ρ was obtained (unit: Ω·m). The measurement was carried out by IR meter (4329A made by HEWLETT PACKARD). $10^6$ Ω·m or more of the specific resistance ρ in the present examples were determined good.

Temperature Characteristic of Initial Permeability $\mu_i$

Change rate of initial permeability $\mu_i$ at 25 to 125° C., as reference to a room temperature of 25° C., was obtained. It was determined good when change rate $\mu_i$ was within ±30%, and was determined particularly good when change rate $\mu_i$ was within ±25%, in the present example.

DC Superimposition Characteristic 30 turns of the copper wire was wound to the toroidal core sample, and the inductance $L_0$, which direct current is not applied, and the inductance L, which direct current 4 A is applied, were measured. Change rate (%) of "L" was determined 100×(L−$L_0$)/$L_0$. DC superimposition characteristic was determined good, when said change rate of "L" was −20.0% or more. Note, in the example, DC superimposition characteristic was always determined good when said change rate of "L" was plus.

TABLE 1

| Sample No. | $Fe_2O_3$ [mol %] | NiO [mol %] | CuO [mol %] | ZnO [mol %] | $SiO_2$ [parts by weight] | $Co_3O_4$ [parts by weight] | $Bi_2O_3$ [parts by weight] | Co/Si | Initial Permeability $\mu_i$ | Frequency characteristic f [MHz] | Frequency characteristic f × ($\mu_i$ − 1) | Specific Resistance ρ [Ω·m] | DC superposition characteristics Change rate of "L" [%] | Temperature characteritics Change rate of "μi" [%] |
|---|---|---|---|---|---|---|---|---|---|---|---|---|---|---|
| 1* | 34.1 | 52.0 | 7.7 | 6.2 | 1.6 | 0.0 | 1.4 | 0.0 | 6.2 | 155 | 801 | 3.1E+05 | −13.2% | 0.2% |
| 2* | 34.1 | 52.0 | 7.7 | 6.2 | 1.6 | 0.5 | 1.4 | 0.3 | 5.7 | 251 | 1188 | 7.6E+05 | −10.2% | 3.0% |
| 3 | 34.1 | 52.0 | 7.7 | 6.2 | 1.6 | 1.0 | 1.4 | 0.6 | 5.2 | 306 | 1293 | 1.4E+08 | −7.4% | 5.1% |
| 4 | 34.1 | 52.0 | 7.7 | 6.2 | 1.6 | 1.4 | 1.4 | 0.9 | 4.9 | 359 | 1409 | 5.4E+07 | −7.6% | 7.5% |
| 5 | 34.1 | 52.0 | 7.7 | 6.2 | 1.6 | 2.4 | 1.4 | 1.5 | 4.3 | 495 | 1624 | 4.5E+07 | −0.1% | 10.6% |
| 6 | 34.1 | 52.0 | 7.7 | 6.2 | 1.6 | 4.8 | 1.4 | 3.1 | 3.4 | 739 | 1772 | 7.8E+06 | 7.2% | 20.8% |
| 7 | 34.1 | 52.0 | 7.7 | 6.2 | 1.6 | 7.2 | 1.4 | 4.6 | 3.1 | 833 | 1725 | 2.2E+06 | 13.6% | 26.1% |
| 8* | 34.1 | 52.0 | 7.7 | 6.2 | 1.6 | 9.6 | 1.4 | 6.2 | 2.6 | 1018 | 1667 | 7.2E+05 | 14.9% | 34.6% |

*is Comp. Ex.

In samples 1 to 8 of Table 1, all the compositions except Co were the same, which is within a range of the invention, and only content amount of Co was varied.

From Table 1, in case when all the compositions of the main component and the subcomponent are within the range of the invention (Samples 3 to 7), the initial permeability $\mu_i$ the frequency characteristic, specific resistance ρ, DC superimposition characteristic, and the temperature characteristic of the initial permeability $\mu_i$ were all determined good.

To the contrary, according to sample 1, which does not include Co and only includes Si and Bi as the subcomponent, the frequency characteristic was too low and specific resistance ρ and DC superimposition characteristic were not preferable.

Sample 2 includes Co as the subcomponent, but the content amount of Co is too low. The frequency characteristic, the specific resistance ρ and the DC superimposition characteristic of sample 2 were improved relative to those of sample 1; however, it remained that the frequency characteristic, the specific resistance ρ and the DC superimposition characteristic of sample 2 were not preferable.

Further, according to sample 8, in which Co content amount is within a range of the invention but Co/Si is without the range of the invention, the specific resistance ρ was lowered and the temperature characteristic of initial permeability $\mu_i$ was deteriorated.

TABLE 2

| Sample No. | Fe$_2$O$_3$ [mol %] | NiO [mol %] | CuO [mol %] | ZnO [mol %] | SiO$_2$ [parts by weight] | Co$_3$O$_4$ [parts by weight] | Bi$_2$O$_3$ [parts by weight] | Co/Si | Initial Permeability $\mu_i$ | Frequency Characteristic f [MHz] | Frequency Characteristic f × ($\mu_i$ − 1) | Specific Resistance $\rho$ [Ω · m] | DC superposition characteristics Change rate of "L" [%] | Temperature characteritics Change rate of "$\mu_i$" [%] |
|---|---|---|---|---|---|---|---|---|---|---|---|---|---|---|
| 9* | 29.3 | 44.8 | 6.9 | 19.0 | 5.5 | 0.0 | 1.3 | 0.0 | 5.2 | 161 | 685 | 7.3E+05 | −1.1% | −1.5% |
| 10 | 29.3 | 44.8 | 6.9 | 19.0 | 5.5 | 2.1 | 1.3 | 0.4 | 4.1 | 332 | 1040 | 1.4E+08 | 2.4% | 7.3% |
| 11 | 29.3 | 44.8 | 6.9 | 19.0 | 5.5 | 4.3 | 1.3 | 0.8 | 3.6 | 476 | 1220 | 5.4E+07 | 6.5% | 14.5% |
| 12 | 29.3 | 44.8 | 6.9 | 19.0 | 5.5 | 6.4 | 1.3 | 1.2 | 3.1 | 605 | 1286 | 1.9E+07 | 8.3% | 18.8% |
| 13 | 29.3 | 44.8 | 6.9 | 19.0 | 5.5 | 8.5 | 1.3 | 1.5 | 2.8 | 739 | 1317 | 7.1E+06 | 10.2% | 23.8% |
| 14 | 29.3 | 44.8 | 6.9 | 19.0 | 5.5 | 12.8 | 1.3 | 2.3 | 2.3 | 1018 | 1335 | 1.9E+07 | 11.7% | 27.9% |
| 15* | 29.3 | 44.8 | 6.9 | 19.0 | 5.5 | 17.0 | 1.3 | 3.1 | 2.2 | 1195 | 1461 | 7.2E+06 | 14.7% | 32.1% |
| 16* | 29.3 | 44.8 | 6.9 | 19.0 | 5.5 | 21.3 | 1.3 | 3.9 | 1.9 | 1347 | 1278 | 7.3E+06 | 16.0% | 36.1% |

*is Comp. Ex.

According to samples 9 to 16 in Table 2, content amounts of the main component, Si and Bi are varied from samples 1 to 8. In particular, the content amount of Si was increased from 1.6 parts by weight to 5.5 parts by weight, and the content amount of Co was varied.

From Table 2, in case when all the compositions of the main component and the subcomponent are within the range of the invention (Samples 10 to 14), the initial permeability $\mu_i$, the frequency characteristic, the specific resistance $\rho$, the DC superimposition characteristic, and the temperature characteristic of the initial permeability $\mu_i$ were all determined good. In particular, good characteristics can be obtained by sample 14 (12.8 parts by weight), having larger Co content than sample 8 (9.6 parts by weight). This is caused by Si content amount increase in sample 14 relative to sample 8. Co/Si of sample 14 became within the range of the invention.

To the contrary, sample 9 which does not include Co and includes only Si and Bi as the subcomponent, shows excessively low frequency characteristic, and also excessively low specific resistance $\rho$.

According to samples 15 and 16, having excessively high content amount of Co, both showed not preferable values of the temperature characteristic of the initial permeability $\mu_i$.

TABLE 3

| Sample No. | Fe$_2$O$_3$ [mol %] | NiO [mol %] | CuO [mol %] | ZnO [mol %] | SiO$_2$ [parts by weight] | Co$_3$O$_4$ [parts by weight] | Bi$_2$O$_3$ [parts by weight] | Co/Si | Initial Permeability $\mu_i$ | Frequency Characteristic f [MHz] | Frequency Characteristic f × ($\mu_i$ − 1) | Specific Resistance $\rho$ [Ω · m] | DC superposition characteristics Change rate of "L" [%] | Temperature characteristics Change rate of "$\mu_i$" [%] |
|---|---|---|---|---|---|---|---|---|---|---|---|---|---|---|
| 17* | 36.0 | 55.0 | 8.0 | 1.0 | 0.0 | 5.0 | 1.5 | — | 2.5 | 1059 | 1540 | 1.1E+06 | 21.5% | 75.8% |
| 18* | 35.0 | 53.5 | 7.8 | 3.7 | 0.8 | 4.9 | 1.5 | 6.2 | 3.1 | 903 | 1896 | 3.4E+06 | 10.1% | 32.0% |
| 6 | 34.1 | 52.0 | 7.7 | 6.2 | 1.6 | 4.8 | 1.4 | 3.1 | 3.4 | 739 | 1772 | 7.8E+06 | 7.2% | 20.8% |
| 19 | 32.3 | 49.4 | 7.4 | 10.9 | 3.0 | 4.6 | 1.4 | 1.5 | 4.3 | 495 | 1658 | 2.7E+07 | 0.4% | 18.1% |
| 20 | 30.7 | 47.0 | 7.1 | 15.2 | 4.3 | 4.4 | 1.3 | 1.0 | 4.0 | 495 | 1466 | 3.6E+07 | 4.0% | 15.6% |
| 21 | 29.3 | 44.8 | 6.9 | 19.0 | 5.5 | 4.3 | 1.3 | 0.8 | 3.6 | 476 | 1220 | 5.4E+07 | 6.5% | 14.5% |
| 22 | 28.0 | 42.8 | 6.7 | 22.5 | 6.6 | 4.1 | 1.2 | 0.6 | 3.3 | 457 | 1073 | 6.5E+07 | 5.8% | 12.0% |
| 23 | 26.8 | 41.0 | 6.5 | 25.7 | 7.7 | 4.0 | 1.2 | 0.5 | 3.2 | 476 | 1039 | 7.2E+07 | 6.3% | 11.5% |
| 24* | 25.7 | 39.3 | 6.3 | 28.6 | 8.7 | 3.8 | 1.1 | 0.4 | 3.1 | 476 | 977 | 1.0E+08 | 6.1% | 10.3% |
| 25* | 24.4 | 37.3 | 6.1 | 32.2 | 9.9 | 3.7 | 1.1 | 0.4 | 2.8 | 457 | 836 | 1.3E+08 | 5.5% | 8.2% |
| 26* | 20.5 | 31.3 | 5.4 | 42.9 | 13.6 | 3.2 | 0.9 | 0.2 | 2.5 | 439 | 676 | 1.1E+08 | 4.8% | 5.6% |
| 17* | 36.0 | 55.0 | 8.0 | 1.0 | 0.0 | 5.0 | 1.5 | — | 2.5 | 1059 | 1540 | 1.1E+06 | 21.5% | 75.8% |
| 26b | 36.0 | 55.0 | 8.0 | 1.0 | 0.8 | 4.4 | 1.5 | 5.5 | 2.9 | 951 | 1807 | 4.0E+06 | 13.1% | 23.6% |
| 27a | 36.0 | 56.0 | 8.0 | 0.0 | 1.0 | 5.0 | 1.5 | 5.0 | 2.6 | 1059 | 1740 | 3.8E+06 | 11.3% | 23.4% |
| 27b | 36.0 | 55.0 | 8.0 | 1.0 | 1.0 | 5.0 | 1.5 | 5.0 | 2.8 | 1018 | 1822 | 3.2E+06 | 12.5% | 25.0% |
| 28 | 36.0 | 55.0 | 8.0 | 1.0 | 3.0 | 5.0 | 1.5 | 1.7 | 2.9 | 903 | 1723 | 1.9E+06 | 8.9% | 23.8% |
| 29 | 36.0 | 55.0 | 8.0 | 1.0 | 5.0 | 5.0 | 1.5 | 1.0 | 2.6 | 867 | 1356 | 2.0E+06 | 11.4% | 19.6% |
| 30a | 36.0 | 55.0 | 8.0 | 1.0 | 7.0 | 5.0 | 1.5 | 0.7 | 2.7 | 833 | 1422 | 1.6E+06 | 10.4% | 18.2% |
| 30b | 36.0 | 55.0 | 8.0 | 1.0 | 10.0 | 5.0 | 1.5 | 0.5 | 2.5 | 833 | 1220 | 1.2E+06 | 9.8% | 15.5% |
| 30c* | 36.0 | 55.0 | 8.0 | 1.0 | 12.0 | 5.0 | 1.5 | 0.4 | 1.7 | 1059 | 766 | 4.4E+05 | 9.5% | 13.0% |

*is Comp. Ex.

According to samples 17 to 26, $SiO_2$ content amount was increased from the $SiO_2$ content amount of sample 6, and content amounts of the components such as ZnO were varied not to greatly change the initial permeability $\mu_i$.

From Table 3, in case when all the compositions of the main component and the subcomponent are within the range of the invention (Samples 6, 19 to 23), the initial permeability $\mu_i$, the frequency characteristic, specific resistance $\rho$, the DC superimposition characteristic, and the temperature characteristic of the initial permeability $\mu_i$ were all determined good. To the contrary, sample 30c, in which content amount of silicon compound is excessively high and Co/Si is excessively low, is inferior in the relative frequency characteristic with respect to permeability and in the specific resistance.

TABLE 4

| Sample No. | $Fe_2O_3$ [mol %] | NiO [mol %] | CuO [mol %] | ZnO [mol %] | $SiO_2$ [parts by weight] | $Co_3O_4$ [parts by weight] | $Bi_2O_3$ [parts by weight] | Co/Si | Relative density [%] | Initial Permeability | Frequency Characteristic f [MHz] | f × ($\mu_i$ − 1) | Specific Resistance $\rho$ [Ω · m] | DC superposition characteristics Change rate of "L" [%] | Temperature characteristics Change rate of "$\mu_i$" [%] |
|---|---|---|---|---|---|---|---|---|---|---|---|---|---|---|---|
| 31* | 32.3 | 49.4 | 7.4 | 10.9 | 3.0 | 4.6 | 0.2 | 1.5 | 71.67% | 2.8 | 476 | 852 | 2.8E+05 | 8.7% | 14.4% |
| 32* | 32.3 | 49.4 | 7.4 | 10.9 | 3.0 | 4.6 | 0.5 | 1.5 | 72.29% | 2.7 | 439 | 727 | 2.5E+05 | 6.8% | 10.2% |
| 33 | 32.3 | 49.4 | 7.4 | 10.9 | 3.0 | 4.6 | 0.9 | 1.5 | 95.83% | 3.9 | 422 | 1233 | 4.9E+06 | −1.3% | 18.6% |
| 19 | 32.3 | 49.4 | 7.4 | 10.9 | 3.0 | 4.6 | 1.4 | 1.5 | 97.18% | 4.3 | 495 | 1658 | 2.7E+07 | 0.4% | 18.1% |
| 34a | 32.3 | 49.4 | 7.4 | 10.9 | 3.0 | 4.6 | 4.6 | 1.5 | 99.59% | 4.6 | 457 | 1627 | 1.2E+06 | −2.1% | 17.8% |
| 34b | 32.3 | 49.4 | 7.4 | 10.9 | 3.0 | 4.6 | 9.2 | 1.5 | 99.87% | 4.3 | 476 | 1586 | 1.5E+08 | −0.5% | 17.2% |
| 35 | 32.3 | 49.4 | 7.4 | 10.9 | 3.0 | 4.6 | 18.4 | 1.5 | 99.93% | 3.9 | 495 | 1456 | 6.2E+07 | 2.3% | 16.7% |
| 36 | 32.3 | 49.4 | 7.4 | 10.9 | 3.0 | 4.6 | 27.6 | 1.5 | 99.78% | 4.4 | 422 | 1416 | 2.0E+07 | −3.9% | 17.2% |

*is Comp. Ex.

ability $\mu_i$, the frequency characteristic, specific resistance $\rho$, the DC superimposition characteristic, and the temperature characteristic of the initial permeability $\mu_i$ were all determined good.

Sample 17, which did not include Si as the subcomponent, was extremely deteriorated in the temperature characteristic of the initial permeability $\mu_i$. Sample 18, which includes Si as the subcomponent but the content amount is too low, showed an improvement in the temperature characteristic of the initial permeability $\mu_i$ relative to those of sample 17; however, it remained that the temperature characteristic of the initial permeability $\mu_i$ was not preferable.

Samples 24 to 26, in which compositions of the main component are without the range of the invention, the relative frequency characteristic with respect to permeability was inferior. In addition, sample 26, in which silicon compound and Co/Si are without the range of the invention, was further inferior in the relative frequency characteristic with respect to permeability when compared with samples 24 and 25.

Further, samples 26b and 27 to 30 (other than sample 27a) in Table 3 include the same compositions with sample 17 except Si; and Si content amounts are only varied in said samples. Note sample 27a has the same composition with sample 27b, except content amount of zinc oxide was zero and the same of nickel oxide was 56.0 mol %.

From Table 3, in case when all the compositions of the main component and the subcomponent are within the range of the invention (Samples 26b, 27a, 27b, 28, 29, 30a and 30b), the initial permeability $\mu_i$, the frequency characteristic, In samples 31 to 36 of Table 4, the compositions were the same with those in sample 19, except Bi; and only Bi content amount was varied in said samples. Further, considering samples 19 and 31 to 36 in Table 4, relative densities were measured, to confirm the sintering property.

The relative density was measured by calculating the sintering density from size and weight of the sintering body after firing, and calculating the relative density as the sintering density with respect to theoretical density. 80% or more relative density was determined good, and 90% or more relative density was determined particularly good, in the present example.

From Table 4, in case when all the compositions of the main component and the subcomponent are within the range of the invention (Samples 19 and 33 to 36), the initial permeability $\mu_i$, the frequency characteristic, the specific resistance $\rho$, the DC superimposition characteristic, the temperature characteristic of the initial permeability $\mu_i$, and the relative density (the sintering property) were all determined good.

To the contrary, samples 31 and 32, in which content amount of Bi is excessively low, show small relative density and low specific resistance $\rho$. Namely, sintering properties of samples 31 and 32 were extremely lowered. Further, the relative frequency characteristics with respect to permeability in samples 31 and 32 were also inferior.

TABLE 5

| Sample No. | Fe$_2$O$_3$ [mol %] | NiO [mol %] | CuO [mol %] | ZnO [mol %] | SiO$_2$ [parts by weight] | Co$_3$O$_4$ [parts by weight] | Bi$_2$O$_3$ [parts by weight] | Co/Si | Initial Permeability | Frequency Characteristic f [MHz] | f × ($\mu_i$ − 1) | Specific Resistance $\rho$ [$\Omega \cdot$ m] | DC superposition characteristics Change rate of "L" [%] | Temperature characteritics Change rate of "$\mu_i$" [%] |
|---|---|---|---|---|---|---|---|---|---|---|---|---|---|---|
| 6 | 34.1 | 52.0 | 7.7 | 6.2 | 1.6 | 4.8 | 1.4 | 3.1 | 3.4 | 739 | 1772 | 7.8E+06 | 7.2% | 20.8% |
| 38 | 37.8 | 48.2 | 7.7 | 6.4 | 1.6 | 4.8 | 1.4 | 3.1 | 3.9 | 682 | 1963 | 4.4E+06 | 8.8% | 23.9% |
| 38a | 39.2 | 46.2 | 7.7 | 6.4 | 1.6 | 4.8 | 1.4 | 3.1 | 4.1 | 625 | 1938 | 5.6E+06 | 9.5% | 24.5% |
| 39 | 41.5 | 44.3 | 7.7 | 6.5 | 1.6 | 4.8 | 1.4 | 3.1 | 4.5 | 525 | 1851 | 9.6E+06 | 11.4% | 26.4% |
| 39a | 43.3 | 42.4 | 7.7 | 6.6 | 1.6 | 4.8 | 1.4 | 3.1 | 4.9 | 490 | 1911 | 1.3E+07 | 12.0% | 27.2% |
| 40 | 45.2 | 40.5 | 7.6 | 6.7 | 1.6 | 4.8 | 1.4 | 3.1 | 5.6 | 418 | 1943 | 2.6E+07 | 14.0% | 28.7% |
| 40a | 45.7 | 40.0 | 7.6 | 6.7 | 1.6 | 4.8 | 1.4 | 3.1 | 5.8 | 400 | 1900 | 9.4E+06 | 14.3% | 29.5% |
| 40b* | 46.0 | 39.5 | 7.6 | 6.9 | 1.6 | 4.8 | 1.4 | 3.1 | 5.8 | 390 | 1872 | 9.3E+06 | 14.5% | 30.1% |
| 41* | 48.9 | 36.6 | 7.6 | 6.9 | 1.6 | 4.8 | 1.4 | 3.1 | 6.7 | 298 | 1708 | 5.8E+06 | 17.6% | 33.9% |

*is Comp. Ex.

Further, samples 38 to 41 in Table 5 include the same subcomponent composition with sample 6, and the main component composition was varied from sample 6.

From Table 5, in case when all the compositions of the main component and the subcomponent are within the range of the invention (Samples 6, 38 to 40 and 40a), the initial permeability $\mu_i$, the frequency characteristic, the specific resistance $\rho$, the DC superimposition characteristic, and the temperature characteristic of the initial permeability $\mu_i$ were all determined good.

To the contrary, sample 41, in which content amount of Fe is excessively large and the same of Ni is excessively small, showed excessively low frequency characteristic, and the temperature characteristic of the initial permeability $\mu_i$ was also not preferable. Sample 40b, in which content amount of Ni is excessively small, also showed not preferable temperature characteristic of the initial permeability $\mu_i$ of the invention (Samples 53 to 58), the initial permeability $\mu_i$, the frequency characteristic, the specific resistance $\rho$, the DC superimposition characteristic, and the temperature characteristic of the initial permeability $\mu_i$ were all determined good.

To the contrary, sample 51, in which Co is not included, and only Si and Bi were included as the subcomponent, showed excessively small frequency characteristic and showed not preferable specific resistance $\rho$ and DC superimposition characteristic.

Sample 52 includes Co as the subcomponent, but the content amount of Co is too low. The frequency characteristic, the specific resistance $\rho$ and the DC superimposition characteristic of sample 52 were improved relative to those of sample 51; however, it remained that the frequency characteristic and the DC superimposition characteristic of sample 52 were not preferable.

TABLE 6

| Sample No. | Fe$_2$O$_3$ [mol %] | NiO [mol %] | CuO [mol %] | ZnO [mol %] | SiO$_2$ [parts by weight] | Co$_3$O$_4$ [parts by weight] | Bi$_2$O$_3$ [parts by weight] | Co/Si | Initial Permeability | Frequency Characteritic f [MHz] | f × ($\mu_i$ − 1) | Specific Resistanc $\rho$ [$\Omega \cdot$ m] | DC superposition characteristics Change rate of "L" [%] | Temperature characteritics Change rate of "$\mu_i$" [%] |
|---|---|---|---|---|---|---|---|---|---|---|---|---|---|---|
| 51* | 37.8 | 48.2 | 7.6 | 6.5 | 1.5 | 0.0 | 1.4 | 0.0 | 7.7 | 147 | 990 | 4.6E+05 | −24.8% | −2.2% |
| 52* | 37.8 | 48.2 | 7.6 | 6.5 | 1.5 | 0.5 | 1.4 | 0.3 | 7.0 | 166 | 994 | 6.4E+06 | −22.1% | 3.1% |
| 53 | 37.8 | 48.2 | 7.6 | 6.5 | 1.5 | 1.0 | 1.4 | 0.6 | 6.4 | 201 | 1086 | 5.7E+07 | −19.9% | 5.5% |
| 54 | 37.8 | 48.2 | 7.6 | 6.5 | 1.5 | 1.4 | 1.4 | 1.0 | 6.0 | 240 | 1209 | 6.1E+07 | −19.2% | 8.3% |
| 55 | 37.8 | 48.2 | 7.6 | 6.5 | 1.5 | 2.4 | 1.4 | 1.6 | 5.3 | 312 | 1342 | 2.5E+07 | −12.4% | 14.0% |
| 56 | 37.8 | 48.2 | 7.6 | 6.5 | 1.5 | 3.6 | 1.4 | 2.4 | 4.7 | 406 | 1493 | 1.6E+07 | −5.8% | 20.2% |
| 57 | 37.8 | 48.2 | 7.6 | 6.5 | 1.5 | 4.8 | 1.4 | 3.2 | 4.1 | 482 | 1494 | 5.7E+06 | −5.0% | 24.9% |
| 58 | 37.8 | 48.2 | 7.6 | 6.5 | 1.5 | 7.2 | 1.4 | 4.8 | 3.6 | 632 | 1643 | 2.4E+06 | 1.3% | 29.0% |
| 59* | 37.8 | 48.2 | 7.6 | 6.5 | 1.5 | 9.6 | 1.4 | 6.4 | 3.2 | 812 | 1786 | 6.3E+05 | 2.6% | 44.0% |

"*" is Comp. Ex.

Samples 51 to 59 in Table 6 include the same compositions within a range of the invention, except only the content amount of Co was varied.

From Table 6, in case when all the compositions of the main component and the subcomponent are within the range Further, according to sample 59, in which Co content amount is within a range of the invention but Co/Si is without the range of the invention, the specific resistance $\rho$ was lowered and the temperature characteristic of initial permeability $\mu_i$ was deteriorated.

TABLE 7

| Sample No. | Fe$_2$O$_3$ [mol %] | NiO [mol %] | CuO [mol %] | ZnO [mol %] | SiO$_2$ [parts by weight] | Co$_3$O$_4$ [parts by weight] | Bi$_2$O$_3$ [parts by weight] | Co/Si | Initial Permeability | Frequency Characteritic f [MHz] | f × ($\mu_i$ − 1) | Specific Resistance ρ [Ω·m] | DC superposition characteristics Change rate of "L" [%] | Temperature characteritics Change rate of "$\mu_i$" [%] |
|---|---|---|---|---|---|---|---|---|---|---|---|---|---|---|
| 61* | 43.7 | 44.6 | 7.8 | 3.9 | 0.8 | 0.0 | 1.5 | 0.0 | 9.9 | 140 | 1246 | 5.0E+06 | −25.8% | 1.2% |
| 62* | 43.7 | 44.6 | 7.8 | 3.9 | 0.8 | 0.3 | 1.5 | 0.4 | 9.4 | 150 | 1260 | 9.9E+06 | −23.9% | 1.3% |
| 63* | 43.7 | 44.6 | 7.8 | 3.9 | 0.8 | 0.6 | 1.5 | 0.8 | 9.0 | 176 | 1408 | 9.0E+06 | −22.0% | 2.0% |
| 64 | 43.7 | 44.6 | 7.8 | 3.9 | 0.8 | 1.0 | 1.5 | 1.3 | 8.5 | 203 | 1527 | 1.6E+07 | −19.5% | 5.2% |
| 65 | 43.7 | 44.6 | 7.8 | 3.9 | 0.8 | 1.5 | 1.5 | 1.9 | 7.8 | 252 | 1720 | 1.1E+07 | −16.2% | 9.0% |
| 66 | 43.7 | 44.6 | 7.8 | 3.9 | 0.8 | 2.0 | 1.5 | 2.5 | 7.2 | 298 | 1843 | 1.6E+07 | −13.2% | 12.6% |
| 67 | 43.7 | 44.6 | 7.8 | 3.9 | 0.8 | 4.0 | 1.5 | 5.1 | 5.1 | 382 | 1566 | 3.6E+06 | −7.6% | 24.9% |
| 68* | 43.7 | 44.6 | 7.8 | 3.9 | 0.8 | 4.5 | 1.5 | 5.7 | 4.7 | 421 | 1558 | 3.7E+06 | −4.4% | 30.3% |
| 69* | 43.7 | 44.6 | 7.8 | 3.9 | 0.8 | 5.0 | 1.5 | 6.3 | 4.3 | 449 | 1482 | 2.1E+06 | −1.3% | 33.5% |

"*" is Comp. Ex.

Samples 61 to 69 in Table 7 include the same compositions within a range of the invention, except only the content amount of Co was varied.

From Table 7, in case when all the compositions of the main component and the subcomponent are within the range of the invention (Samples 64 to 67), the initial permeability $\mu_i$, the frequency characteristic, the specific resistance ρ, the DC superimposition characteristic, and the temperature characteristic of the initial permeability $\mu_i$ were all determined good.

To the contrary, sample 61, in which Co is not included and only Si and Bi are included as the subcomponent, showed excessively low frequency characteristic and also showed not preferable DC superimposition characteristic.

Samples 62 and 63 include Co as the subcomponent, but the content amount of Co is too low. The frequency characteristic and the DC superimposition characteristic of samples 62 and 63 were improved relative to those of sample 61; however, it remained that the frequency characteristic and the DC superimposition characteristic of samples 62 and 63 were not preferable.

Further, according to samples 68 and 69, in which Co content amount is within a range of the invention but Co/Si is without the range of the invention, the temperature characteristic of initial permeability $\mu_i$ was deteriorated.

TABLE 8

| Sample No. | Fe$_2$O$_3$ [mol %] | NiO [mol %] | CuO [mol %] | ZnO [mol %] | SiO$_2$ [parts by weight] | Co$_3$O$_4$ [parts by weight] | Bi$_2$O$_3$ [parts by weight] | Co/Si | Initial Permeability | Frequency Characteritic f [MHz] | f × ($\mu_i$ − 1) | Specific Resistance ρ [Ω·m] | DC superposition characteristics Change rate of "L" [%] | Temperature characteritics Change rate of "$\mu_i$" [%] |
|---|---|---|---|---|---|---|---|---|---|---|---|---|---|---|
| 71* | 37.8 | 48.2 | 7.6 | 6.5 | 0.0 | 1.5 | 1.4 | — | 5.0 | 277 | 1106 | 3.6E+06 | 7.5% | 50.1% |
| 72* | 37.8 | 48.2 | 7.6 | 6.5 | 0.4 | 1.5 | 1.4 | 3.8 | 5.4 | 263 | 1169 | 1.9E+06 | −0.9% | 34.5% |
| 73 | 37.8 | 48.2 | 7.6 | 6.5 | 0.8 | 1.5 | 1.4 | 1.9 | 5.9 | 249 | 1219 | 9.4E+06 | −2.6% | 25.0% |
| 74 | 37.8 | 48.2 | 7.6 | 6.5 | 2.0 | 1.5 | 1.4 | 0.8 | 5.8 | 251 | 1205 | 6.1E+07 | −1.5% | 19.3% |
| 75 | 37.8 | 48.2 | 7.6 | 6.5 | 3.0 | 1.5 | 1.4 | 0.5 | 5.9 | 236 | 1161 | 2.4E+06 | −5.1% | 15.6% |
| 76 | 37.8 | 48.2 | 7.6 | 6.5 | 4.0 | 1.5 | 1.4 | 0.4 | 5.6 | 229 | 1053 | 1.0E+07 | −2.6% | 15.3% |
| 77* | 37.8 | 48.2 | 7.6 | 6.5 | 6.0 | 1.5 | 1.4 | 0.3 | 5.1 | 223 | 914 | 3.1E+06 | −3.6% | 14.9% |
| 81* | 37.8 | 48.2 | 7.6 | 6.5 | 0.0 | 3.6 | 1.4 | — | 4.1 | 422 | 1315 | 1.6E+06 | 3.2% | 76.1% |
| 82 | 37.8 | 54.7 | 7.6 | 0.0 | 0.8 | 3.6 | 1.4 | 4.5 | 4.4 | 422 | 1449 | 3.1E+06 | −5.2% | 24.4% |
| 83 | 37.8 | 48.2 | 7.6 | 6.5 | 0.8 | 3.6 | 1.4 | 4.5 | 4.9 | 379 | 1464 | 2.7E+06 | −6.9% | 23.4% |
| 56 | 37.8 | 48.2 | 7.6 | 6.5 | 1.5 | 3.6 | 1.4 | 2.4 | 4.7 | 406 | 1493 | 1.6E+07 | −5.8% | 20.2% |
| 84 | 37.8 | 48.2 | 7.6 | 6.5 | 3.0 | 3.6 | 1.4 | 1.2 | 4.9 | 360 | 1395 | 9.4E+06 | −9.4% | 19.9% |
| 85 | 37.8 | 48.2 | 7.6 | 6.5 | 5.0 | 3.6 | 1.4 | 0.7 | 4.3 | 346 | 1141 | 7.5E+06 | −6.9% | 19.5% |
| 86 | 37.8 | 48.2 | 7.6 | 6.5 | 10.0 | 3.6 | 1.4 | 0.4 | 4.1 | 332 | 1040 | 2.6E+06 | −8.5% | 15.2% |
| 87* | 37.8 | 48.2 | 7.6 | 6.5 | 12.0 | 3.6 | 1.4 | 0.3 | 2.9 | 422 | 798 | 9.5E+05 | −8.8% | 14.3% |
| 91* | 37.8 | 48.2 | 7.6 | 6.5 | 0.0 | 4.8 | 1.4 | — | 3.6 | 516 | 1326 | 2.4E+07 | 3.6% | 80.1% |
| 92* | 37.8 | 48.2 | 7.6 | 6.5 | 0.8 | 4.8 | 1.4 | 6.0 | 4.2 | 463 | 1491 | 9.9E+06 | −4.8% | 30.5% |
| 93 | 37.8 | 48.2 | 7.6 | 6.5 | 1.5 | 4.8 | 1.4 | 3.2 | 4.1 | 482 | 1494 | 2.5E+06 | −5.4% | 24.9% |
| 94 | 37.8 | 48.2 | 7.6 | 6.5 | 3.0 | 4.8 | 1.4 | 1.6 | 4.2 | 440 | 1421 | 4.4E+06 | −9.0% | 22.7% |
| 95 | 37.8 | 48.2 | 7.6 | 6.5 | 5.0 | 4.8 | 1.4 | 1.0 | 3.7 | 423 | 1153 | 4.5E+06 | −6.5% | 21.6% |
| 96 | 37.8 | 48.2 | 7.6 | 6.5 | 7.0 | 4.8 | 1.4 | 0.7 | 3.7 | 415 | 1100 | 2.0E+07 | −7.5% | 21.5% |
| 97 | 37.8 | 48.2 | 7.6 | 6.5 | 10.0 | 4.8 | 1.4 | 0.5 | 3.6 | 406 | 1049 | 4.0E+06 | −8.1% | 20.5% |
| 98* | 37.8 | 48.2 | 7.6 | 6.5 | 12.0 | 4.8 | 1.4 | 0.4 | 3.6 | 384 | 991 | 9.4E+05 | −8.4% | 19.2% |

"*" is Comp. Ex.

Samples 71 to 77 in Table 8 included the same composition with sample 56, except Si and Co. Content amount of Co was 1.5 parts by weight in terms of Co$_3$O$_4$, and content amount of Si was varied in said samples 71 to 77.

From Table 8, in case when all the compositions of the main component and the subcomponent are within the range of the invention (Samples 73 to 76), the initial permeability $\mu_i$, the frequency characteristic, the specific resistance ρ, the DC superimposition characteristic, and the temperature characteristic of the initial permeability $\mu_i$ were all determined good.

To the contrary, sample 71, in which Si was not included as the subcomponent, showed extreme deterioration in the temperature characteristic of the initial permeability $\mu_i$. In addition, sample 72 includes Si as the subcomponent, but the content amount of Si is too low. The temperature characteristic of the initial permeability $\mu_i$ of sample 72 was improved relative to those of sample 71; however, it remained that the temperature characteristic of the initial permeability $\mu_i$ of sample 72 was not preferable.

In addition, sample 77 in which Co/Si is excessively small was inferior in the relative frequency characteristic with respect to permeability.

of the invention (Samples 93 to 97), the initial permeability $\mu_i$, the frequency characteristic, the specific resistance ρ, the DC superimposition characteristic, and the temperature characteristic of the initial permeability $\mu_i$ were all determined good.

To the contrary, sample 91, in which Si is not included as the subcomponent, showed extreme deterioration in the temperature characteristic of the initial permeability $\mu_i$. In addition, sample 92 includes Si as the subcomponent, but Co/Si is too large. The temperature characteristic of the initial permeability $\mu_i$ of sample 92 was improved relative to those of sample 91; however, it remains that the temperature characteristic of the initial permeability $\mu_i$ of sample 92 was not preferable.

In addition, sample 98, in which content amount of Si is excessively large, was inferior in the relative frequency characteristic with respect to permeability and in the specific resistance ρ.

TABLE 9

| Sample No. | $Fe_2O_3$ [mol %] | NiO [mol %] | CuO [mol %] | ZnO [mol %] | $SiO_2$ [parts by weight] | $Co_3O_4$ [parts by weight] | $Bi_2O_3$ [parts by weight] | Co/Si | Relative density [%] | Initial Permeability | Frequency Characteristic f [MHz] | f × ($\mu_i$ − 1) | Specific Resistance ρ [Ω·m] | DC superposition characteristics Change rate of "L" [%] | Temperature characteritics Change rate of "$\mu_i$" [%] |
|---|---|---|---|---|---|---|---|---|---|---|---|---|---|---|---|
| 101* | 37.8 | 48.2 | 7.6 | 6.5 | 1.5 | 3.6 | 0.2 | 2.3 | 69.56% | 3.0 | 390 | 781 | 2.3E+05 | 3.2% | 17.4% |
| 102* | 37.8 | 48.2 | 7.6 | 6.5 | 1.5 | 3.6 | 0.5 | 2.3 | 70.33% | 2.9 | 360 | 669 | 4.5E+05 | 0.4% | 13.8% |
| 103 | 37.8 | 48.2 | 7.6 | 6.5 | 1.5 | 3.6 | 0.7 | 2.3 | 81.06% | 3.9 | 353 | 1023 | 1.5E+06 | −3.5% | 11.5% |
| 104 | 37.8 | 48.2 | 7.6 | 6.5 | 1.5 | 3.6 | 1.0 | 2.3 | 95.43% | 4.2 | 346 | 1113 | 2.4E+06 | −7.6% | 15.7% |
| 56 | 37.8 | 48.2 | 7.6 | 6.5 | 1.5 | 3.6 | 1.4 | 2.3 | 97.44% | 4.7 | 406 | 1493 | 1.6E+07 | −5.8% | 20.2% |
| 105 | 37.8 | 48.2 | 7.6 | 6.5 | 1.5 | 3.6 | 4.6 | 2.3 | 99.20% | 4.9 | 374 | 1464 | 9.0E+06 | −8.9% | 19.4% |
| 106 | 37.8 | 48.2 | 7.6 | 6.5 | 1.5 | 3.6 | 10.0 | 2.3 | 99.29% | 4.7 | 390 | 1428 | 1.1E+07 | −6.3% | 14.8% |
| 107 | 37.8 | 48.2 | 7.6 | 6.5 | 1.5 | 3.6 | 18.4 | 2.3 | 99.99% | 4.2 | 406 | 1315 | 3.0E+07 | −3.9% | 16.7% |
| 108 | 37.8 | 48.2 | 7.6 | 6.5 | 1.5 | 3.6 | 30.0 | 2.3 | 99.18% | 4.7 | 346 | 1275 | 9.8E+07 | −9.8% | 16.5% |
| 111* | 43.7 | 44.6 | 7.8 | 3.9 | 0.8 | 1.5 | 0.2 | 1.9 | 71.04% | 5.0 | 242 | 974 | 1.0E+05 | −14.9% | 12.0% |
| 112* | 43.7 | 44.6 | 7.8 | 3.9 | 0.8 | 1.5 | 0.5 | 1.9 | 73.25% | 4.8 | 223 | 845 | 8.8E+05 | −17.0% | 12.9% |
| 113 | 43.7 | 44.6 | 7.8 | 3.9 | 0.8 | 1.5 | 0.7 | 1.9 | 83.27% | 5.9 | 219 | 1078 | 1.1E+06 | −14.2% | 11.7% |
| 114 | 43.7 | 44.6 | 7.8 | 3.9 | 0.8 | 1.5 | 1.0 | 1.9 | 92.94% | 7.1 | 215 | 1301 | 5.0E+06 | −17.4% | 10.1% |
| 65 | 43.7 | 44.6 | 7.8 | 3.9 | 0.8 | 1.5 | 1.5 | 1.9 | 93.86% | 7.8 | 252 | 1720 | 1.1E+07 | −16.2% | 9.0% |
| 115 | 43.7 | 44.6 | 7.8 | 3.9 | 0.8 | 1.5 | 4.6 | 1.9 | 99.40% | 8.2 | 232 | 1677 | 3.9E+07 | −19.0% | 9.6% |
| 116 | 43.7 | 44.6 | 7.8 | 3.9 | 0.8 | 1.5 | 10.0 | 1.9 | 98.98% | 7.8 | 242 | 1647 | 8.3E+06 | −17.5% | 11.7% |
| 117 | 43.7 | 44.6 | 7.8 | 3.9 | 0.8 | 1.5 | 18.4 | 1.9 | 99.77% | 7.1 | 252 | 1536 | 9.8E+06 | −13.8% | 15.3% |
| 118 | 43.7 | 44.6 | 7.8 | 3.9 | 0.8 | 1.5 | 30.0 | 1.9 | 99.87% | 7.8 | 215 | 1469 | 7.9E+06 | −19.4% | 13.3% |

*is Comp. Ex.

Samples 81 to 87 in Table 8 included the same compositions with sample 56 except Si; and Si content amounts are only varied in said samples. Note sample 82 shows the same composition with sample 83, except content amount of zinc oxide is zero and the same of nickel oxide is 54.7 mol %.

In case when all the compositions of the main component and the subcomponent are within the range of the invention (Samples 82 to 86), the initial permeability $\mu_i$, the frequency characteristic, the specific resistance ρ, the DC superimposition characteristic, and the temperature characteristic of the initial permeability $\mu_i$ were all determined good.

To the contrary, sample 81, not including Si as the subcomponent showed extreme deterioration in the temperature characteristic of the initial permeability $\mu_i$.

Further, according to sample 87, in which Si content amount is excessively large and Co/Si is excessively small, showed deterioration in the relative frequency characteristic with respect to permeability and in the specific resistance ρ.

Samples 91 to 98 in Table 8 includes the same composition with sample 56, except Si and Co. Content amount of Co was 4.8 parts by weight in terms of $Co_3O_4$, and content amount of Si was varied in said samples 91 to 98.

From Table 8, in case when all the compositions of the main component and the subcomponent are within the range The compositions of samples 101 to 108 in Table 9 were the same with the composition of sample 56, except Bi; and only Bi content amounts in said samples were varied. In addition, the relative density of samples 56, 65, and 101 to 118 were measured, in order to confirm the sintering property.

From Table 9, in case when all the compositions of the main component and the subcomponent are within the range of the invention (Samples 56, 65, 103 to 108 and 113 to 118), the initial permeability $\mu_i$, the frequency characteristic, the specific resistance ρ, the DC superimposition characteristic, the temperature characteristic of the initial permeability $\mu_i$ and the relative density (sintering property) were all determined good.

To the contrary, samples 101, 102, 111 and 112, in which content amount of Bi is excessively small, showed decrease in the relative density and in the specific resistance ρ. Namely, the sintering property of samples 101, 102, 111 and 112 was extremely lowered. In addition, the relative frequency characteristic with respect to permeability of samples 101, 102, 111 and 112 were also inferior.

TABLE 10

| Sample No. | Fe$_2$O$_3$ [mol %] | NiO [mol %] | CuO [mol %] | ZnO [mol %] | SiO$_2$ [parts by weight] | Co$_3$O$_4$ [parts by weight] | Bi$_2$O$_3$ [parts by weight] | Co/Si | ZrO2 | Relative Density [%] | Initial Permeability μ$_i$ | Frequency characteristic f [MHz] | f × (μ$_r$ − 1) | Specific Resistance ρ [Ω · m] | DC superposition characteristics Change rate of "L" [%] | Temperature characteristics Change rate of "μi" [%] |
|---|---|---|---|---|---|---|---|---|---|---|---|---|---|---|---|---|
| 56 | 37.8 | 48.2 | 7.6 | 6.5 | 1.5 | 3.6 | 1.4 | 2.3 | 0.00 | 97.44% | 4.7 | 406 | 1493 | 1.6E+07 | −5.8% | 20.2% |
| 121 | 37.8 | 48.2 | 7.6 | 6.5 | 1.5 | 3.6 | 1.4 | 2.3 | 0.05 | 96.67% | 4.6 | 404 | 1468 | 2.0E+07 | −3.1% | 18.5% |
| 122 | 37.8 | 48.2 | 7.6 | 6.5 | 1.5 | 3.6 | 1.4 | 2.3 | 0.20 | 94.35% | 4.5 | 398 | 1394 | 1.8E+07 | −4.1% | 14.6% |
| 123 | 37.8 | 48.2 | 7.6 | 6.5 | 1.5 | 3.6 | 1.4 | 2.3 | 0.50 | 89.72% | 4.2 | 386 | 1250 | 1.5E+07 | −2.7% | 12.0% |
| 124 | 37.8 | 48.2 | 7.6 | 6.5 | 1.5 | 3.6 | 1.4 | 2.3 | 1.00 | 82.00% | 3.8 | 366 | 1025 | 1.9E+06 | −3.1% | 11.5% |

The composition of samples 121 to 124 in Table 10 is the same with the composition of sample 56, except content amount of ZrO$_2$ is varied. In addition, the relative density of samples 56 and 121 to 124 in Table 10 were measured, in order to confirm the sintering property.

From Table 10, in case when all the compositions of the main component and the subcomponent are within the range of the invention (Samples 56 and 121 to 124), the initial permeability μ$_i$, the frequency characteristic, the specific resistance ρ, the DC superimposition characteristic, the temperature characteristic of the initial permeability μ$_i$, and the relative density (sintering property) were all determined good.

DESCRIPTIONS OF THE NUMERALS

1: Multilayer inductor
2: Element
3: Terminal electrode
4: Ferrite layer
5: Coil conductor
5a and 5b: Extraction electrode
10: LC composite electrode device
12: Inductor part
14: Condenser part

The invention claimed is:

1. A ferrite composition comprising a main component and a subcomponent, in which
   the main component comprises 26.8 to 44 mol % of an iron oxide in terms of Fe$_2$O$_3$, 4 to 14 mol % of a copper oxide in terms of CuO, 0 to 25.7 mol % of a zinc oxide in terms of ZnO, and a residue of 40.0 to 54.7 mol % of a nickel oxide in terms of NiO,
   the subcomponent comprises 0.8 to 10.0 parts by weight of a silicon compound in terms of SiO$_2$, 1.0 to 12.8 parts by weight of a cobalt compound in terms of Co$_3$O$_4$, and 0.7 to 30.0 parts by weight of a bismuth compound in terms of Bi$_2$O$_3$, with respect to 100 parts by weight of the main component,
   a ratio of a content of the cobalt compound in terms of Co$_3$O$_4$ divided by a content of the silicon compound in terms of SiO$_2$ is 0.4 to 5.5,
   the ferrite composition includes ferrite grains and crystal grain boundaries, existing between adjacent crystal grains, and
   the average crystal grain size of the crystal grains is 0.2 to 1.5 μm.

2. An electronic component comprising a ferrite sintered body composed of the ferrite composition as set forth in claim 1.

3. The ferrite composition according to claim 1, comprising 32 to 44 mol % of the iron oxide.

4. The ferrite composition according to claim 1, comprising 4 to 12 mol % of the copper oxide.

5. The ferrite composition according to claim 1, comprising 0 to 11 mol % of the zinc oxide.

6. The ferrite composition according to claim 1, comprising 44.0 to 54.7 mol % of the nickel oxide.

7. The ferrite composition according to claim 1, comprising 0.8 to 6.0 parts by weight of the silicon compound.

8. The ferrite composition according to claim 1, comprising 0.7 to 10.0 parts by weight of the bismuth compound.

9. The ferrite composition according to claim 1, comprising 1.0 to 8.5 parts by weight of the cobalt compound.

10. The ferrite composition according to claim 1, comprising 1.0 to 5.0 parts by weight of the cobalt compound.

11. The ferrite composition according to claim 1, wherein the ratio is 1.5 to 5.0.

* * * * *